(12) United States Patent
Moran

(10) Patent No.: US 7,386,653 B2
(45) Date of Patent: Jun. 10, 2008

(54) FLASH MEMORY ARRANGEMENT

(75) Inventor: Dov Moran, Kfar Saba (IL)

(73) Assignee: Sandisk IL Ltd, Kfar Saba (IL)

( * ) Notice: Subject to any disclaimer, the term of this patent is extended or adjusted under 35 U.S.C. 154(b) by 908 days.

(21) Appl. No.: 09/922,153

(22) Filed: Aug. 6, 2001

(65) Prior Publication Data

US 2003/0028708 A1  Feb. 6, 2003

(51) Int. Cl.
  *G06F 13/00*  (2006.01)
  *G06F 9/445*  (2006.01)
(52) U.S. Cl. ............... 711/103; 711/104; 711/170; 713/1; 713/2
(58) Field of Classification Search ............. 711/103, 711/154, 165; 713/2; 365/185.33, 230.03; 710/10; 717/173
See application file for complete search history.

(56) References Cited

U.S. PATENT DOCUMENTS

| | | | |
|---|---|---|---|
| 5,640,349 A * | 6/1997 | Kakinuma et al. ..... 365/185.33 |
| 6,035,346 A * | 3/2000 | Chieng et al. ................ 710/10 |
| 6,201,739 B1 * | 3/2001 | Brown et al. .......... 365/185.29 |
| 6,295,577 B1 * | 9/2001 | Anderson et al. ........... 711/113 |
| 6,370,645 B1 * | 4/2002 | Lee ................................ 713/2 |
| 6,385,688 B1 * | 5/2002 | Mills et al. ................. 711/103 |
| 6,434,695 B1 * | 8/2002 | Esfahani et al. ............... 713/2 |
| 6,523,101 B1 * | 2/2003 | Nakata ....................... 711/169 |
| 6,549,482 B2 * | 4/2003 | Garner .................. 365/230.03 |
| 6,567,911 B1 * | 5/2003 | Mahmoud ...................... 713/2 |
| 6,601,167 B1 * | 7/2003 | Gibson et al. .................. 713/2 |
| 6,615,404 B1 * | 9/2003 | Garfunkel et al. .......... 717/173 |
| 7,058,779 B1 * | 6/2006 | McClain ..................... 711/170 |
| 2002/0138702 A1* | 9/2002 | Gefen et al. ................ 711/154 |

* cited by examiner

*Primary Examiner*—Hyung S Sough
*Assistant Examiner*—Kaushikkumar Patel
(74) *Attorney, Agent, or Firm*—Mark M. Friedman

(57) ABSTRACT

A device, a method and a system for direct execution of code from a flash memory arrangement, in which a separate memory component is not required, even if a flash memory component is used which has a restriction on the size of a data block which can be read at one time. Furthermore, the flash memory arrangement is optionally implemented as a "single die" chip or device, which is more efficient for manufacturing and which also results in lower costs.

10 Claims, 4 Drawing Sheets

FLASH MEMORY ARRANGEMENT

FIELD OF THE INVENTION

The present invention relates to a novel flash memory arrangement, which enables executable code to be read directly from the flash memory, without requiring external memory components.

BACKGROUND OF THE INVENTION

Flash memory arrangements have many different uses, including data storage for portable devices or other devices in which storage size, weight and/or power consumption is a factor. As shown with regard to background art FIG. 1, a typical flash memory arrangement 10 features a port 12 for accessing data, including both reading and writing data. The data itself is stored in a flash memory 14, which is accessible by a CPU 16 through port 12. CPU 16 is able to read and write data through port 12, by communicating with an internal processor 18. CPU 16 sends the appropriate commands to read or write data from a particular address through a bus 17. Reading and writing such data may be typically accomplished according to protocols which are known in the art, with one exception: executable code.

Executable code is actually a series of instructions which are executed by a data processor, such as CPU 16. Such executable code is required for running software programs, and for "booting" the computational device which contains CPU 16 and flash memory arrangement 10. Typical "boot" operations include initialization of the hardware components of the computational device and also loading of required software program(s). Therefore, the ability to execute instructions for booting a computational device is a clear advantage for memory components such as flash memory arrangement 10, particularly in hardware implementations in which flash memory arrangement 10 is intended to substitute for other, heavier or otherwise less suitable memory storage components, such as a magnetic medium hard disk for example.

Unfortunately, certain types of flash memory do not permit the direct execution of code from the memory, or "execution in place" of the code. For example, NAND flash does not permit such direct execution of code. Instead, as shown with regard to FIG. 1, the code must be loaded by CPU 16 from flash memory arrangement 10 to a RAM (random access memory) 22 according to code which is present in an EPROM 24. Other types of memory which may be used are ROM and Nor-flash. In this example, the initial code must be loaded to EPROM 24, since flash memory 14 is a NAND-type flash memory, which requires any data to be read in blocks. Thus, initialization must occur through an additional memory component, such as EPROM 24, which is not a desirable solution since it requires another component to be added to the device. Indeed, in this example, flash memory 14 is optional, since flash memory 14 cannot participate in the boot process.

Other possible solutions include using NOR-flash, which does permit execution in place, as variably-sized blocks of code may be read, but which is less desirable as it is more expensive than NAND flash. A different component than an EPROM may be used, but the requirement for any type of additional memory component is less desirable as it adds to the cost and complexity of manufacture. Unfortunately, there is currently no solution to this problem.

SUMMARY OF THE INVENTION

The background art does not teach or suggest a flash memory arrangement which enables flash memory devices to be used for direct execution of code even if there is a restriction on the size of blocks of data which can be read. In addition, the background art does not teach or suggest a flash memory arrangement which does not require an additional memory component in order to accomplish this goal.

The present invention overcomes these deficiencies of the background art, by providing a device, a method and a system for direct execution of code from a flash memory arrangement, in which a separate memory component is not required, even if a flash memory component is used which has a restriction on the size of a data block which can be read at one time. Furthermore, the flash memory arrangement is optionally implemented as a "single die" chip or device, which is more efficient for manufacturing and which also results in lower costs.

According to a preferred implementation of the present invention, the flash memory arrangement features a flash memory component in direct communication with a volatile memory component, such as S-RAM or D-RAM for example. These two components are preferably arranged within a flash-based unit, and therefore communicate with a logic processor such as a CPU through the port of the flash-based unit. Thus, an additional memory component, outside the flash-based unit, is not required.

According to the present invention, there is provided a flash-based unit for providing code to be executed by an external processor, comprising: (a) a flash memory for storing the code to be executed, the flash memory being of a type such that the external processor cannot read the code to be executed directly from the flash memory; and (b) a volatile memory component for receiving at least a portion of the code to be executed, such that at least the portion of the code is executed by the external processor from the volatile memory component.

According to another embodiment of the present invention, there is provided a system for executing code from a restricted non-volatile memory, the restricted non-volatile memory being characterized in that code cannot be directly executed from the restricted non-volatile memory, the system comprising: (a) a CPU for executing the code; (b) a volatile memory component in direct communication with the restricted non-volatile memory for holding at least a portion of the code to be executed, the at least a portion of the code being transferred from the restricted non-volatile memory, such that the CPU executes the at least a portion of the code from the volatile memory component.

According to yet another embodiment of the present invention, there is provided a system for executing code, comprising: (a) a flash-based unit for storing the code to be executed, the flash-based unit comprising a flash memory of a restricted type, being characterized in that code cannot be directly executed from the flash memory and a volatile memory component for receiving a portion of the code to be executed; and (b) a processor for executing the code, the processor receiving at least the portion of the code from the volatile memory component; wherein an additional memory component is not required for executing the code by the processor.

According to still another embodiment of the present invention, there is provided a method for booting a device, the device featuring a processor for executing code, the method comprising: providing a flash-based unit in the device for storing the code to be executed, the flash-based unit comprising a flash memory of a restricted type, being characterized in that code cannot be directly executed from the flash memory and a volatile memory component for receiving a portion of the code to be executed; sending a busy signal to the processor; transferring the portion of the code to the volatile memory component; removing the busy signal; and executing the portion of the code by the processor to boot the device.

According to another embodiment of the present invention, there is provided a flash-based unit for providing code to be executed by an external processor, consisting essentially of: (a) a flash memory for storing the code to be executed, the flash memory being of a type such that the external processor cannot read the code to be executed directly from the flash memory; and (b) a volatile memory component for receiving at least a portion of the code to be executed, such that at least the portion of the code is executed by the external processor from the volatile memory component.

Hereinafter, the terms "computer" or "computational device" refer to a combination of a particular computer hardware system and a particular software operating system. Examples of such hardware systems include those with any type of suitable data processor, as well as any type of device which has a data processor of some type with an associated memory. The term "portable device" refers to any type of computer or computational device which is portable, including but not limited to, a PalmPilot™, a PilotPC™, a PDA (personal data assistant) or any type of personal data player, a cellular telephone, or any other handheld device.

For the present invention, a software application could be written in substantially any suitable programming language, which could easily be selected by one of ordinary skill in the art. The programming language chosen should be compatible with the computer by which the software application is executed, and in particularly with the operating system of that computer. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware, or a combination thereof.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE INVENTION

The present invention is of a device, a method and a system direct execution of code from a flash memory arrangement, in which a separate memory component is not required, even if a flash memory component is used which has a restriction on the size of a data block which can be read at one time. Furthermore, the flash memory arrangement is optionally implemented as a "single die" chip or device, which is more efficient for manufacturing and which also results in lower costs.

According to a preferred implementation of the present invention, the flash memory arrangement features a flash memory component in direct communication with a volatile memory component, such as S-RAM or D-RAM for example. These two components are preferably arranged within a flash-based unit, and therefore communicate with a logic processor such as a CPU through the port of the flash-based unit. Thus, an additional memory component, outside the flash-based unit, is not required.

The principles and operation of a device, a system and a method according to the present invention may be better understood with reference to the drawings and the accompanying description, it being understood that these drawings are given for illustrative purposes only and are not meant to be limiting. Furthermore, although the following description centers around a NAND flash memory, it is understood that the description would be applicable to any type of non-volatile memory component with a restricted block size for reading data.

Figure 1:
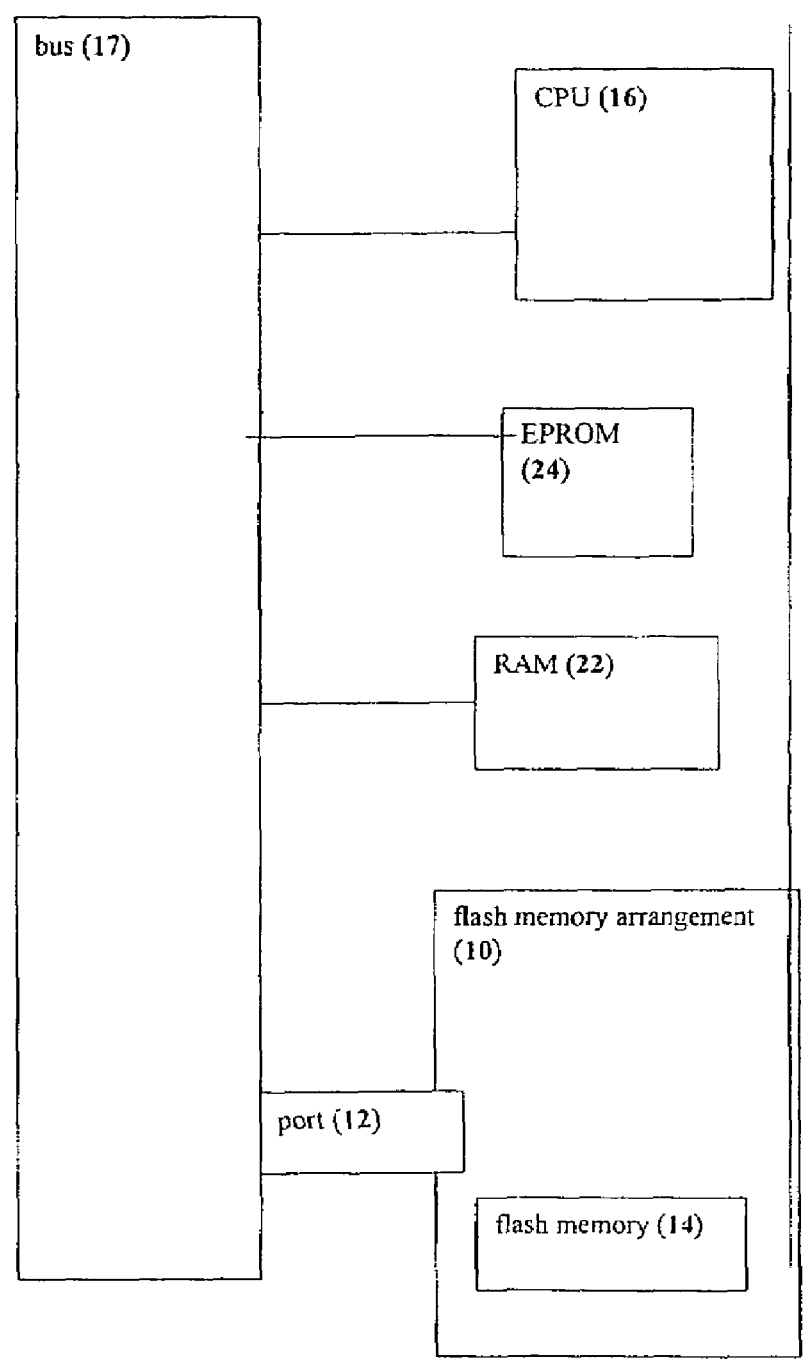
FIG. 1 is a schematic block diagram of a background art memory arrangement.
Figure 2:
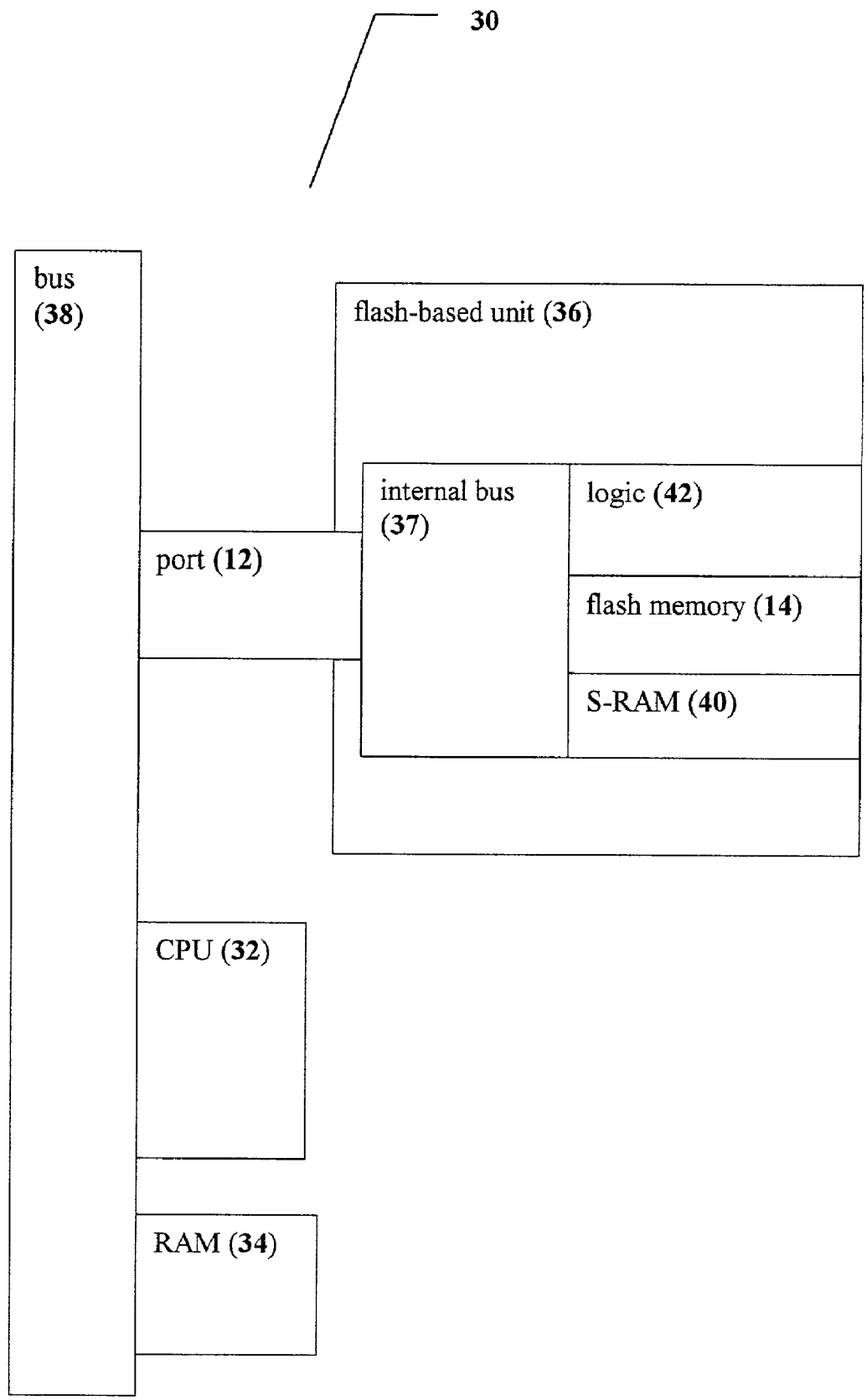
FIG. 2 is a schematic block diagram of an exemplary flash-based unit according to the present invention.

Referring now to the drawings, FIG. 2 is a schematic block diagram of an illustrative, exemplary flash-based unit according to the present invention, shown as part of a system 30 for the purposes of illustration only, without any intention of being limiting. System 30 may optionally be any type of computer or computational device, as long as at least a CPU 32 (or other type of logic processor or microprocessor) and a RAM (random access memory) 34 are present.

System 30 features a flash-based unit 36 according to the present invention, which communicates with CPU 32 and RAM 34 through a bus 38, which is a local bus. CPU 32 executes instructions, such as executable code for example. CPU 32 reads these instructions from RAM 34. However, the code is stored in flash-based unit 36 as the non-volatile memory for system 30 (which may also optionally feature other types of volatile or non-volatile memory).

Flash-based unit 36 differs from the background art memory arrangement in that flash-based unit 36 features a volatile memory component in direct communication with flash memory 14, shown herein as S-RAM 40 for the purposes of illustration only and without any intention of being limiting. Flash memory 14 is preferably implemented as any type of flash memory component for which data can only be read in restricted block size(s) and/or which otherwise is unable to support execution of code in place. One preferred but non-limiting example of flash memory 14 is a NAND flash memory component.

Flash-based unit 36 also features a logic 42, which may optionally be a CPU or other type of microprocessor, but alternatively is a plurality of logic gates, and an internal bus 37 for communication between the components of flash-based unit 36. As shown, internal bus 37 handles communication between port 12 and each of logic 42, flash memory 14 and S-RAM 40 directly. Alternatively, internal bus 37 may optionally handle communication directly only between port 12, S-RAM 40 and logic 42. The latter component then communicates with flash memory 14 (not shown).

Flash-based unit 36 is optionally implemented as either a single-die chip or a modular component. In addition, flash-based unit 36 is also optionally implemented as a BIOS, for "booting" system 30, as described for example with regard to FIG. 3 below.

Figure 3:
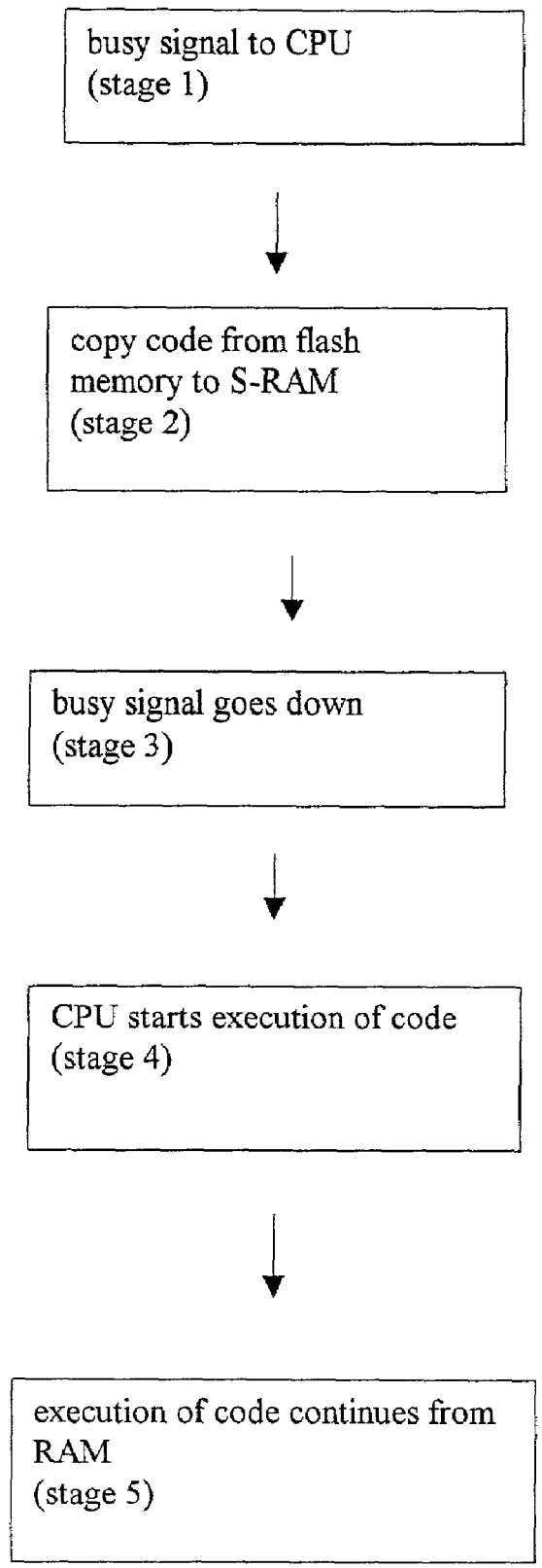
FIG. 3 is a flowchart of an exemplary method for operating the device of FIG. 2 according to the present invention.

The operation of system 30 according to FIG. 2 may optionally be performed as follows, with regard to a preferred but non-limiting example of "booting" system 30 from flash-based unit 36, as shown with regard to the flowchart of FIG. 3. When the "power-on" signal is received, indicating that system 30 should now "boot up", a busy signal on bus 38 signals CPU 32 not to begin operation (stage 1). Next, a specific code (set of one or more instructions) is copied automatically from flash memory 14 to S-RAM 40, without the intervention of CPU 32 (stage 2). For example, such copying of data could optionally be controlled by logic 42. S-RAM 40 is optionally very small, such that the copied code is preferably only sufficient for permitting the basic initialization of system 30, and more preferably enables the remaining portion of the code to be copied to RAM 34 at a later point (see below for more details). It should be noted that at this point, copying to RAM 34 is not permitted.

Now, the busy signal goes down from bus 38 in stage 3. CPU 32 begins execution of the code in stage 4 for booting. Optionally, additional code is copied from flash memory 14 to RAM 34 for execution as necessary, after which execution continues from RAM 34, as shown in stage 5.

Figure 4:
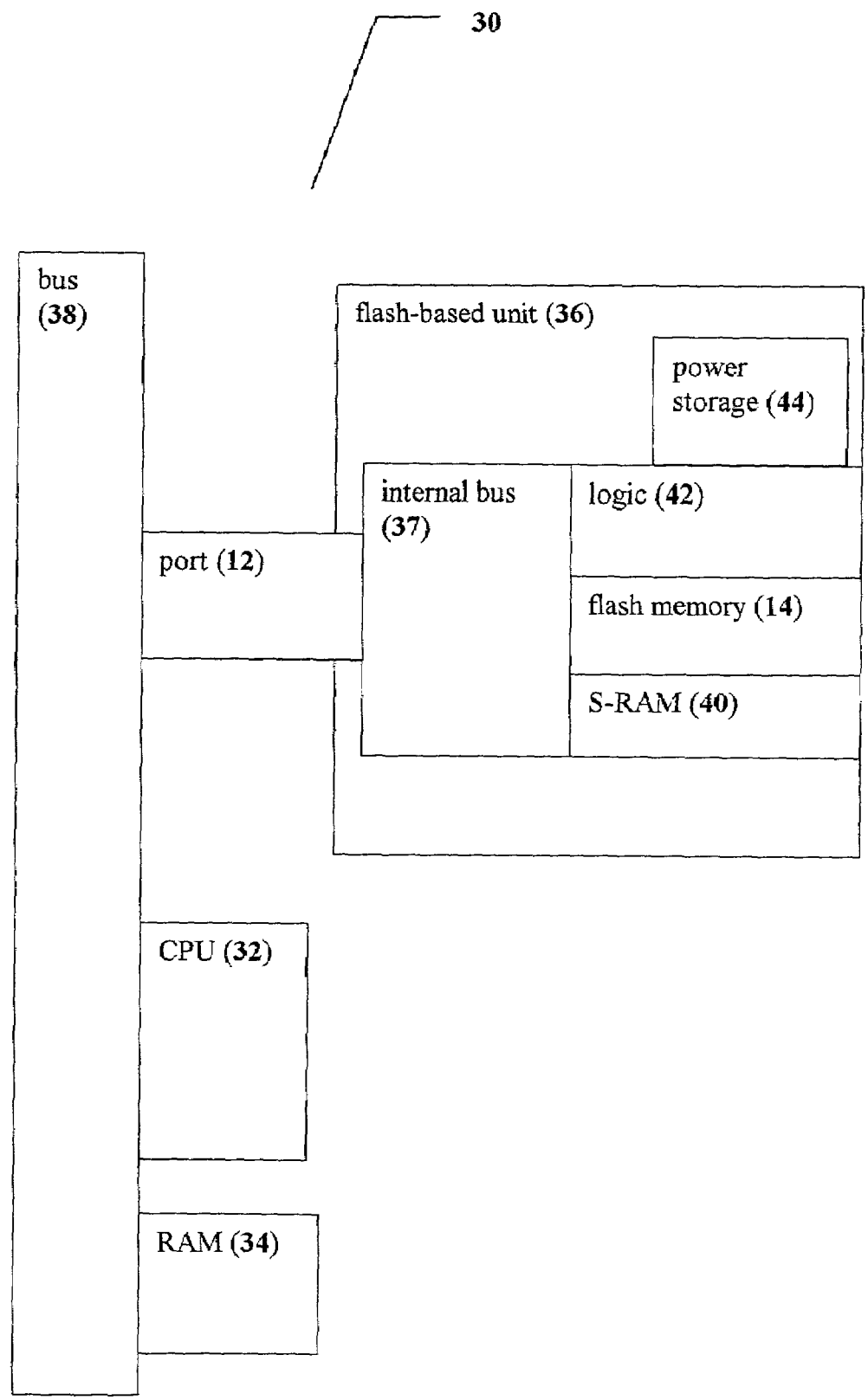
FIG. 4 is a schematic block diagram of another implementation of an exemplary flash-based unit according to the present invention.

According to an optional embodiment of the present invention, as shown in FIG. 4, system 30 additionally features a power storage 44 for storing power. Power storage 44 may optionally be implemented as a battery, but is preferably implemented as a capacitor. In any case, power storage 44 should be independent of other sources of power to flash-based unit 36. Power storage 44 is used to provide power to flash-based unit 36, at least for a limited period of time, if flash-based unit 36 suddenly stops receiving power from other source(s).

Logic 42 preferably senses when flash-based unit 36 suddenly stops receiving power from other source(s). Next, logic 42 causes power to be drawn from power storage 44. More preferably, power storage 44 provides only a very limited amount of power, as for a capacitor for example. Most preferably, power storage 44 only provides sufficient power to enable the contents of S-RAM 40 to be copied to flash memory 14 and/or to another, more permanent memory.

It will be appreciated that the above descriptions are intended only to serve as examples, and that many other embodiments are possible within the spirit and the scope of the present invention.

What is claimed is:

1. A method for booting a system, the system featuring a processor executing boot code, the method comprising:
    providing a flash-based unit in the system storing the boot code to be executed, said flash-based unit comprising a flash memory of a restricted type, being characterized in that code cannot be directly executed from said flash memory, and a volatile memory component, implemented as a single die chip with the flash memory, receiving a portion of the boot code to be executed, said portion of the boot code being for basic initialization of hardware of the system;
    sending a busy signal to said processor;
    transferring said portion of the boot code to said volatile memory component;
    removing said busy signal; and
    executing said portion of the boot code by said processor to boot the system.

2. The method of claim 1, wherein said flash-based unit is separate from the processor.

3. The method of claim 1, wherein said busy signal is sent in response to a power-on signal.

4. A method for booting a system, the system featuring a processor executing boot code, the method comprising:
    providing a flash-based unit in the system storing the boot code to be executed, said flash-based unit comprising a flash memory of a restricted type, being characterized in that code cannot be directly executed from said flash memory, and a volatile memory component, implemented as a single die chip with the flash memory, receiving a portion of the boot code to be executed;
    transferring a first portion of the boot code to said volatile memory component, said first portion of the boot code being for basic initialization of hardware of the system and containing a command for copying a second portion of the boot code; and
    executing said first portion of the boot code by said processor to boot the system.

5. The method of claim 4, further comprising the step of:
    transferring said second portion of the boot code for booting the system.

6. A flash-based unit storing boot code to be executed by an external processor, comprising:
    (a) a flash memory storing the boot code to be executed, said flash memory being of a type such that the boot code cannot be executed in place from said flash memory; and
    (b) a volatile memory component, implemented as a single die chip with the flash memory, receiving at least a portion of the boot code to be executed, such that at least said portion of the boot code is executed by the external processor from said volatile memory component, said at least portion of the boot code being only sufficient for basic initialization of hardware of a system that includes the external processor, said volatile memory component being only large enough to store said at least portion of the boot code.

7. A system executing boot code from a restricted non-volatile memory, the restricted non-volatile memory being characterized in that code cannot be directly executed from the restricted non-volatile memory, the system comprising:
    (a) a central processing unit (CPU) executing the boot code; and
    (b) a volatile memory component, implemented as a single die chip with the flash memory, in direct communication with the restricted non-volatile memory for holding at least a portion of the boot code to be executed, said at least portion of the boot code being transferred from the restricted non-volatile memory, such that said CPU executes said at least portion of the boot code from said volatile memory component, said at least portion of the boot code being only sufficient for basic initialization of hardware of the system, said volatile memory component being only large enough to store said at least portion of the boot code.

8. A system executing boot code, comprising:
    (a) a flash-based unit storing the boot code to be executed, said flash-based unit comprising a flash memory of a restricted type, being characterized in that the boot code cannot be directly executed from said flash memory, and a volatile memory component, implemented as a single die chip with the flash memory, receiving a portion of the boot code to be executed, said portion of the boot code being only sufficient for basic initialization of hardware of the system, said volatile memory component being only large enough to store said at least portion of the boot code; and (b) a processor executing the boot code, said processor receiving at least said portion of the boot code from said volatile memory component;

wherein an additional memory component is not required for executing the boot code by said processor.

9. A flash-based unit storing boot code to be executed by an external processor, consisting essentially of:

(a) a flash memory storing the boot code to be executed, said flash memory being of a type such that the boot code cannot be executed in place from said flash memory, and (b) a volatile memory component, implemented as a single die chip with the flash memory, receiving at least a portion of the boot code to be executed, such that at least said portion of the boot code is executed by the external processor from said volatile memory component, said at least portion of the boot code being only sufficient for basic initialization of hardware of a system that includes the external processor, said volatile memory component being only large enough to store said at least portion of the boot code.

10. A method for booting a system, the system featuring a processor executing boot code, the method comprising:

providing a flash-based unit in the system storing the boot code to be executed, said flash-based unit comprising a flash memory of a restricted type, being characterized in that code cannot be directly executed from said flash memory, and a volatile memory component, implemented as a single die chip with the flash memory, receiving a portion of the boot code to be executed;

transferring a first portion of the boot code to said volatile memory component, using a logic separate from the processor, said first portion of the boot code being sufficient for basic initialization of the system and containing a command for copying a second portion of the boot code; and executing said first portion of the boot code by said processor to boot the system.

* * * * *